United States Patent [19]

Vinarsky

[11] Patent Number: 5,676,285

[45] Date of Patent: Oct. 14, 1997

[54] HANGER-CLIP ACCESSORY FOR SPORTS BOTTLE

[76] Inventor: Michael A. Vinarsky, 671 Dover Ct., Elgin, Ill. 60120-7610

[21] Appl. No.: 471,911

[22] Filed: Jun. 7, 1995

[51] Int. Cl.⁶ ........................................ A45F 5/00
[52] U.S. Cl. ........................ 224/148.1; 224/148.4; 224/148.7; 224/414; 224/932
[58] Field of Search ............... 224/148.1, 148.2, 224/148.3, 148.4, 148.5, 148.6, 148.7, 482, 414; 215/390, 395, 399; 220/737, 741

[56] References Cited

U.S. PATENT DOCUMENTS

| | | | |
|---|---|---|---|
| 4,915,337 | 4/1990 | Iwasaki | 224/482 |
| 4,925,042 | 5/1990 | Chong | 224/148.2 |
| 4,955,572 | 9/1990 | Simmons | 224/148.7 |
| 5,145,094 | 9/1992 | Perlmutter | 222/153 |
| 5,167,354 | 12/1992 | Cohanfard | 222/148.7 |
| 5,294,028 | 3/1994 | Bankroff | 224/148.7 |
| 5,301,857 | 4/1994 | Green | 224/148.4 |
| 5,325,991 | 7/1994 | Williams | 224/148.5 |
| 5,337,907 | 8/1994 | McKenzie et al. | 224/148.5 |

*Primary Examiner*—Renee S. Luebke
*Assistant Examiner*—Kam R. Shah
*Attorney, Agent, or Firm*—Charles F. Lind

[57] ABSTRACT

A sports bottle accessory is disclosed operable to be coupled to the sports bottle when the cap for the bottle is connected in place to close the bottle. The accessory has a ring structure suited to fit around the fill opening neck and be trapped in place under the closure cap when secured on the bottle, or via a connection with the closure cap itself. A hook formed off of accessory and open generally toward the bottle bottom is sized to be fitted over exercise equipment, to allow the bottle to be suspended vertically upright from exercise equipment within reach of the exerciser. A flexible accessory web overlies the side of the bottle below the cap, and clip means coupled to the web spaced from the cap can releasibly hold a towel or the like relative to the bottle.

9 Claims, 2 Drawing Sheets

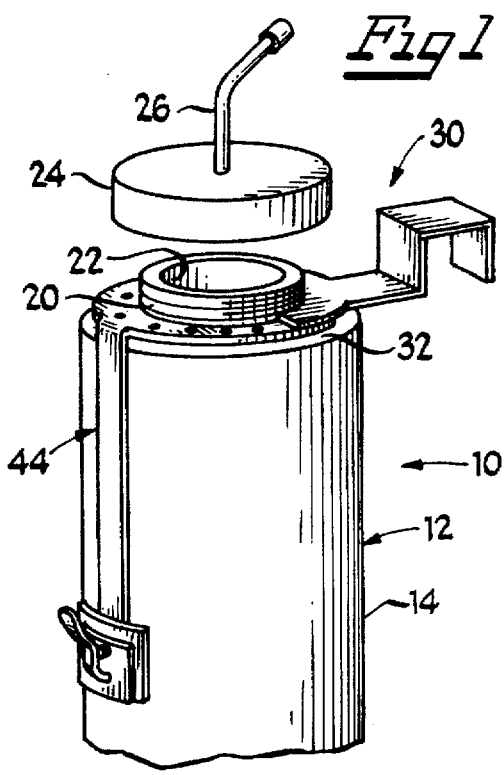
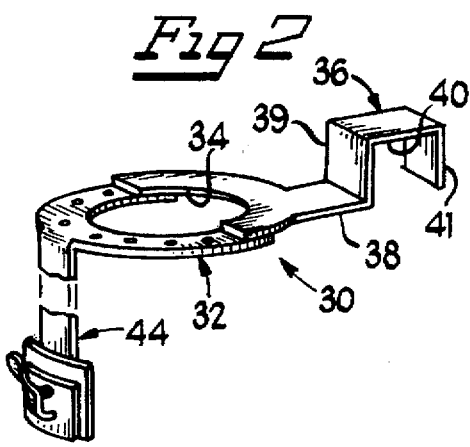
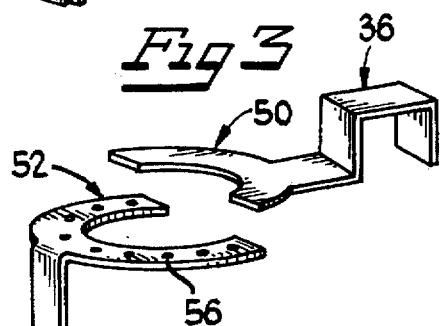
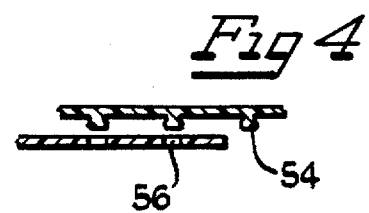
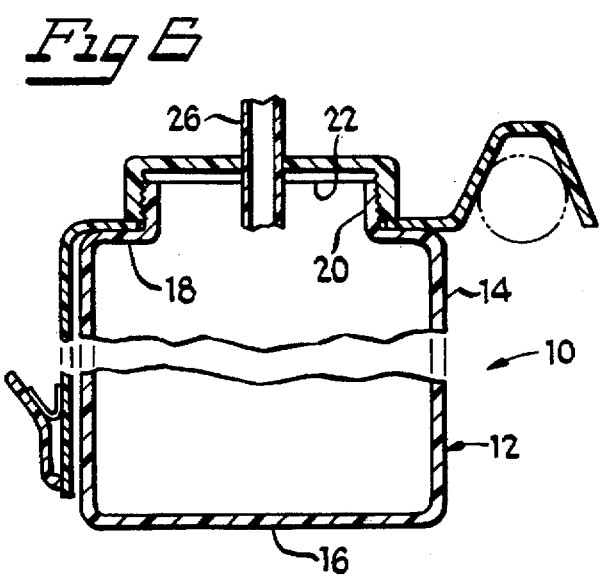
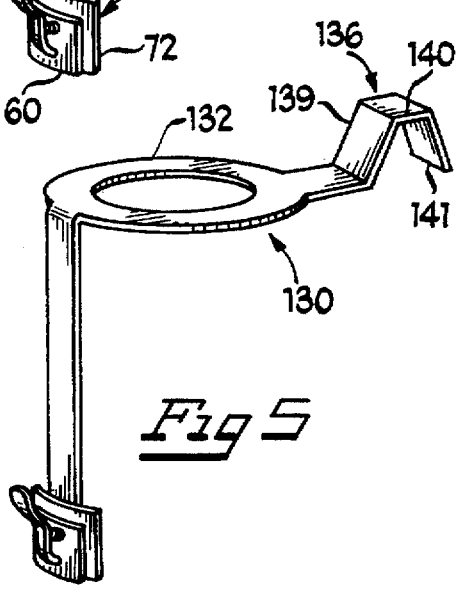

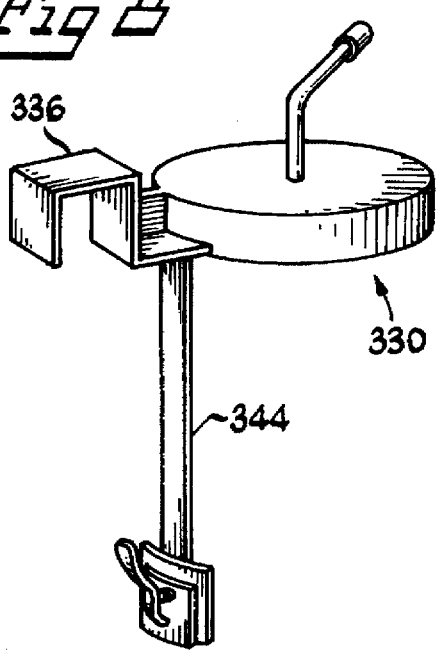
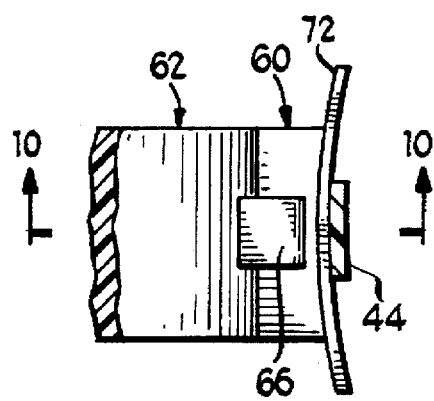
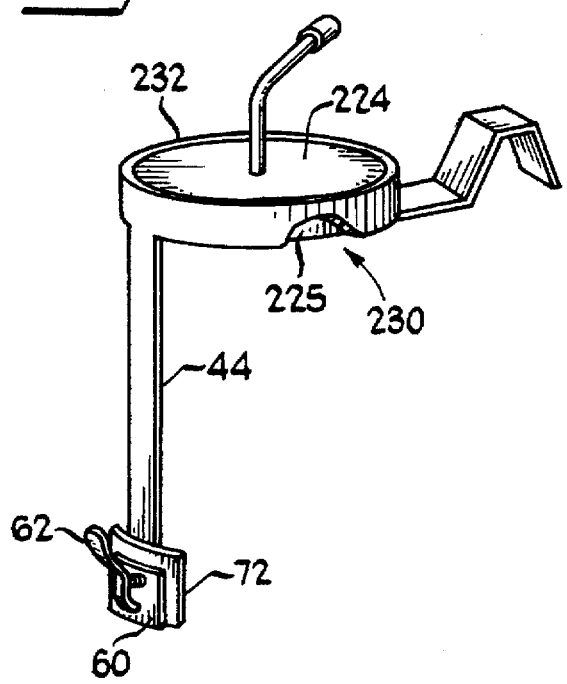
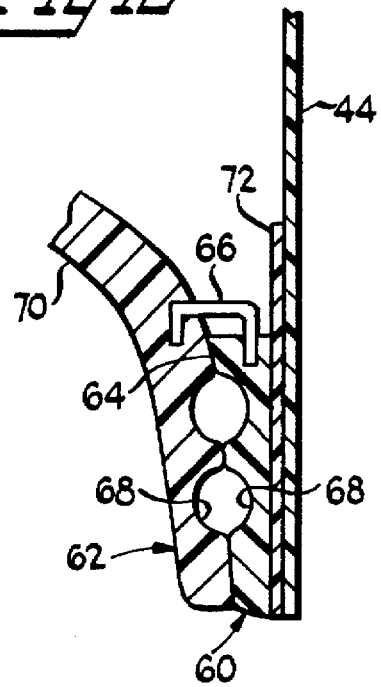

HANGER-CLIP ACCESSORY FOR SPORTS BOTTLE

BACKGROUND OF THE INVENTION

Sports bottles, of the type to which this invention pertains, commonly are of a nonbreakable plastic, with a large fill opening and a screw or snap-on cap for closing the opening, and with straw or squirt outlet means provided through or in the cap. The bottles thus are reasonably durable, reusable with most any liquid drink of choice, economical to make and to purchase, and easy to use in that an exerciser can grip the bottle with one hand and take a drink via the outlet means even while maintaining some exercise pace.

Many exercisers are interested in workouts of extended durations, at either intense or low levels of efforts. Many exercisers thus have available or even carry individual bottles of water or other liquid, to replenish body liquids lost from sweating. Some exercise routines are for extended non-stop durations on a single specific piece of exercise equipment, such as an exercycle, a treadmill, stair climber, etc.; such pieces of equipment now being common at health clubs and elsewhere. These exercisers particularly might seek to take a drink, while maintaining the same exercise pace.

An observed problem seems to be the difficulty exercisers have in finding a place, within reach while remaining on and operating the exercise equipment, for storing the water bottle when not actually drinking from it.

Further, many exercisers want a towel nearby to dry sweat or moisture from one's face or body. Again, an observed problem seems to be keeping the towel nearby and reachable, and in a sanitary manner and not merely heaped on the floor.

SUMMARY OF THE INVENTION

This invention relates to sports bottles, and particularly to an accessory device suited to be used with such bottles.

A basis object of this invention is to provide an accessory device to modify a sports bottle, particularly to allow the bottle to be kept near an exerciser, hooked on typical exercise equipment in a manner that it can be reached by the exerciser while on and even using the equipment for allowing the exerciser to take a drink without interrupting the exercise.

Another object of this invention is to provide an accessory device to modify a sports bottle, particularly to hold a towel in a sanitary manner off the floor but yet nearby for easy access and use by the exerciser as needed, possibly even without interrupting the exercise.

Yet another object of this invention is to provide an accessory device that can be easily and economically fabricated, and used in a universal manner with most conventional sports bottles, to modify such bottles in the manners noted above.

BRIEF DESCRIPTION OF THE DRAWINGS

These and other objects, features or advantages of the invention will be more fully understood and appreciated after considering the following description of the invention, which includes as a part thereof the accompanying drawings, wherein:

FIG. 1 is a side perspective view, partly assemblied but with the cap removed for clarity of disclosure, of a sports bottle having an accessory formed according to this invention in place thereon;

FIG. 2 is a perspective view, similar to FIG. 1, except showing the accessory only;

FIG. 3 is a perspective view, similar to FIG. 2, except showing the accessory components assembled;

FIG. 4 is a sectional view taken through the lock tabs used for size adjusting the accessory of FIGS. 1-3 for fitting on sports bottles of different sizes, showing the components separated for clarity of disclosure;

FIG. 5 is a perspective view of another embodiment of sports bottle accessory only;

FIG. 6 is a centered sectional view of a sports bottle and the accessory of FIG. 5 in place thereon;

FIG. 7 is a perspective view of the accessory of FIG. 5, except fitted over and secured to a cap to become unitary therewith, for an alternative mode of use on a sports bottle;

FIG. 8 is a perspective view of another embodiment of sports bottle accessory shown unitary with the cap;

FIG. 9 is a top view of a clip for the accessory; and

FIG. 10 is a sectional view taken generally from line 10—10 of FIG. 9.

DETAILED DESCRIPTION OF PREFERRED EMBODIMENTS OF THE INVENTION

A conventional plastic sports bottle 10, illustrated in FIGS. 1 and 6, has a liquid-tight body 12 comprised of circumferential side wall 14, and transverse bottom wall 16 and top wall 18; the top wall having an upstanding neck 20 surrounding fill opening 22. The illustrated neck 20 is threaded, to removably accept threaded cap 24 for closing the fill opening (FIG. 6), although a snap-on cap might also be used. With the cap 24 off (FIG. 1), liquid can be easily directed via the fill opening 22 into the bottle body to fill it. Outlet means, such as straw or squirt outlet means 26, provided through or in the cap 24 allows someone to take liquid directly from the bottle and into the mouth without removing the cap or spilling, even while exercising.

A first embodiment of accessory device for such a sports bottle 10 is illustrated as 30 in FIGS. 1-4. The accessory device 30 comprises a ring structure 32 operable to be coupled to the bottle adjacent the neck 20 and cap 24 thereof. The ring structure opening 34 may be sized to fit over the bottle neck 20 until the ring structure is against the top wall 18. A hook 36 formed off of the ring structure 32 and laterally spaced from the ring structure by web 38 is open in the direction transverse to the ring structure. The hook 36 illustrated has spaced side sections 39 and 41 and an interconnecting section 40. The side sections 39 and 41 may be generally parallel and spaced apart by approximately one inch at the open bottom area of the hook, to allow the hook 36 to be fitted over many component structures (not shown) of conventional exercise equipment, such as a handlebar of an exercycle or a frame rail of a treadmill, which would be convenient for the exerciser to reach even while exercising on the piece of equipment.

A flexible web 44 also formed off of the ring structure 32, opposite from the hook 36, may thus extend axially of the bottle away from the neck 20 and lie against the body side wall 14. Clip means 46 coupled to the web 44 spaced from the ring structure 32, may be operable to releasibly hold a towel (not shown) or the like proximate the bottle.

The ring structure 32 is comprised of separate pieces 50 and 52 each having curved ends 50e and 52e that together are long enough to fit around the neck and yet overlap. As illustrated, the hook 36 is formed on piece 50, while the web 44 is formed on piece 52. Cooperating pins 54 and openings 56 formed respectively on the different piece ends 50e and 52e are suited to be interlocked to connect the overlapped ends together at different sizes for the ring structure opening 34, suited to fit over bottle necks or different sizes.

The ring structure 32 thus can be fitted around the exterior of the bottle neck 20 to underlie the cap 24 when such is connected to the neck, effective to removably couple the accessory device 30 to the sports bottle 10.

A preferred clip 46, illustrated in FIGS. 9 and 10, has separate members 60 and 62 pivoted at 64 relative to one another, with C-spring 66 connected between the members tending to pivot the adjacent member jaws 68 closed (as illustrated) for gripping therebetween any towel of the like (not shown). The clip member 60 is secured relative to the web 44, while end 70 of member 62 remote of the pivot 64 from its jaw can be manually biased to overcome the spring force and open the jaws. This allows the exerciser to insert or remove a towel relative to the jaws.

A stiff piece 72 may further be provided on the web, such as between the web and clip member 60, being curved to generally complement the curvature of the bottle side wall 14. When the clip 46 is thus suspended by the web 44, the piece 72 will lie generally flush against the bottle side in a stabilized manner.

The accessory device 30 can thus be universally coupled to and used on most plastic sports bottles to modify the bottle to add several advantageous features. With the hook 36 on a piece of exercising equipment, the bottle 10 can be stably held in an upright leak-proof orientation, with a towel (not shown) held on the bottle in a sanitary manner, each close by and convenient to the exerciser while on the equipment.

The hook 36 and web 38 of the accessory device 30 should be stiff and strong enough for suspending from the supporting exercise equipment structure or the like the coupled sports bottle 10, including its liquid and any towel in the clip means 46. The hook 36 including the web 38 could be made of thicker or otherwise be locally reinforced with ribs or the like to meet local strength needs. The separate pieces 50 and 52 forming the device thus need not be formed to the same specifications, and piece 50 can be thicker or more reinforced than piece 52.

FIG. 5 illustrates a modified accessory device 130, with the ring structure 132 being a single piece that is circumferentially continuous and sized to fit around the standard neck 20 of the conventional sports bottles, suited thereby to allow the device and bottle to be coupled together. The hook 136 illustrated further has the side sections 139 and 141 angled to converge toward the interconnecting section 140.

In both embodiments illustrated thus far, the ring structure 32 or 132 can be fitted around the exterior of the bottle neck 20 to underlie the cap 24 when such is connected to the neck, as illustrated in FIG. 6, thereby effectively coupling the accessory device 30 or 130 to the sports bottle 10.

The embodiment illustrated in FIG. 7 utilizes a unitary accessory device 230 similar to the device 130 of FIG. 5, except it is intended to be united with cap 224. Specifically, the ring structure 232 can be stretched over the side face 225 of the cap 224, to have its webbing flush against the side face and thereby to unite the device and cap together mechanically. It could also be desirable to use an adhesive between the device and cap, making the unitary connection more permanent. The embodiment of FIG. 8 is also of a unitary accessory and cap 330, where the accessory hook 336, clip web 344 and cap can be made as a unit.

In the embodiments of FIGS. 7 and 8, the unitary hook-clip device will automatically be incorporated on the sports bottle when its unitary accessory-cap is connected onto the bottle neck over and closing the fill opening. However, the benefits of modifying a standard sports bottle to have both a hook for hanging the bottle from any appropriate structure including such on exercise equipment and a clip for holding a towel to the bottle are achieved.

While specific embodiments have been illustrated, it will be obvious that minor changes could be made therefrom without departing from the spirit of the invention. Accordingly, the invention is to determined by the scope of the following claims.

What is claimed is:

1. The combination comprising, a sports bottle having a transverse wall with a neck upstanding therefrom and defining a fill opening for liquid, a cap for removable connection to the neck for closing the fill opening, and outlet means provided through or in the closure cap for removing liquid from the bottle;

hook-clip accessory structure operable to be removably coupled to the sports bottle, and comprising a flexible web suited to lie adjacent the bottle and extend away from the neck and fill opening, and clip means coupled to the web spaced from the fill opening, the clip means being operable to releasibly hold a small personal item adjacent and relative to the bottle;

a hook laterally spaced from the fill opening and being open generally in the direction toward the bottom of the bottle, said hook being sized to be fitted over component structures of conventional exercise equipment, such as a handlebar of an exercycle or a frame rail of a treadmill;

said hook having sufficient strength for suspending the sports bottle coupled thereto and any liquid therein or personal item thereon from such component structure; and the hook-clip structure having structure spaced from both the web and the hook and immediately adjacent the cap exterior and effectively united with the cap, to have the hook-clip structure coupled to the sports bottle when the cap is connected onto the bottle neck.

2. A sports bottle accessory according to claim 1, further comprising the flexible web being formed off of the structure opposite from the hook, suited to lie adjacent the bottle and extend away from the neck and fill opening, but opposite thereof from the hook.

3. A sports bottle accessory according to claim 2, further including a broad piece formed on the flexible web next to the clip and shaped to lie generally flush against the side of the bottle to stabilize the clip when releasibly holding a personal item relative to the bottle.

4. A sports bottle accessory according to claim 1, further comprising the flexible web being formed off of the structure opposite from the hook, suited to lie adjacent the bottle and extend away from the neck and fill opening, but opposite thereof from the hook.

5. A sports bottle accessory according to claim 4, further including a broad piece formed on the flexible web next to the clip and shaped to lie generally flush against the side of the bottle to stabilize the clip when releasibly holding a personal item relative to the bottle.

6. The combination comprising, a sports bottle having a transverse wall with a neck upstanding therefrom and defining a fill opening for liquid, a cap for removable connection to the neck for closing the fill opening, and outlet means provided through or in the closure cap for removing liquid from the bottle;

hook-clip accessory structure operable to be removably coupled to the sports bottle, adjacent the neck and cap thereof;

said hook-clip accessory structure comprising a flexible web suited to lie adjacent the bottle and extend away from the neck and fill opening, and clip means coupled to the web spaced from the fill opening, the clip means being operable to releasibly hold a small personal item adjacent and relative to the bottle;

a hook laterally spaced from the fill opening and being open generally in the direction toward the bottom of the bottle, said hook being sized to be fitted over component structures of conventional exercise equipment, such as a handlebar of an exercycle or a frame rail of a treadmill;

said hook having sufficient strength for suspending the sports bottle coupled thereto and any liquid therein or personal item thereon from such component structure; and the hook-clip structure having a unitary ring structure circumferentially continuous and without any break and sized to be stretched to fit around the exterior of the cap to become mechanically connected thereto, effective to have the hook-clip structure coupled to the sports bottle when the cap is connected onto the bottle neck.

7. A sports bottle accessory according to claim 6, further comprising the flexible web being formed off of the structure opposite from the hook, suited to lie adjacent the bottle and extend away from the neck and fill opening, but opposite thereof from the hook.

8. A sports bottle accessory according to claim 6, further including a broad piece formed on the flexible web next to the clip and shaped to lie generally flush against the side of the bottle to stabilize the clip when releasibly holding a personal item relative to the bottle.

9. A sports bottle accessory according to claim 8, further including a broad piece formed on the flexible web next to the clip and shaped to lie generally flush against the side of the bottle to stabilize the clip when releasibly holding a personal item relative to the bottle.

\* \* \* \* \*